Aug. 25, 1953  E. W. DESBARAT  2,649,871
SAW ATTACHMENT FOR DRILLS AND THE LIKE
Filed Oct. 30, 1950
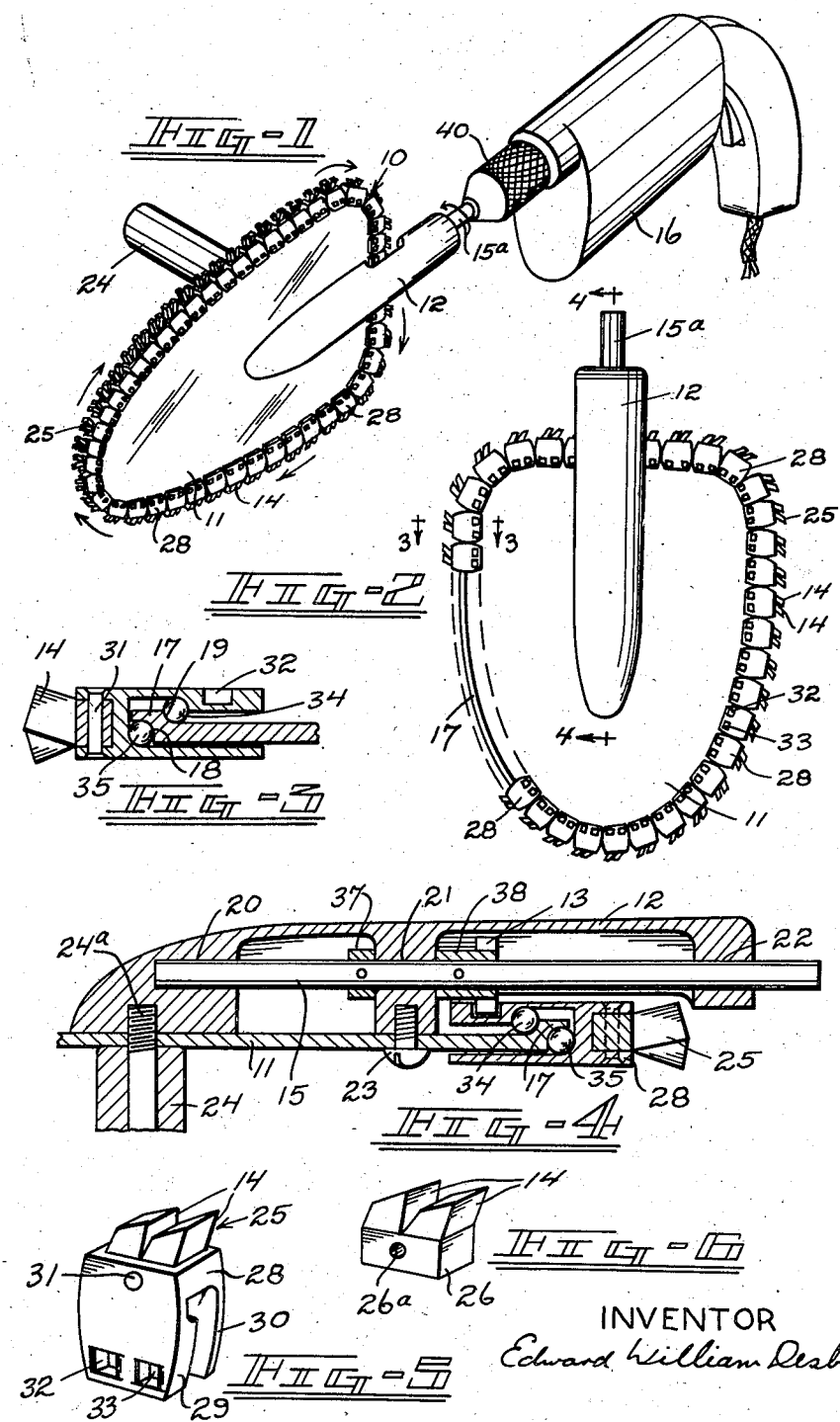
INVENTOR
Edward William Desbarat
by Edward N. Fetherstonhaugh
ATTORNEY Patented Aug. 25, 1953

2,649,871

UNITED STATES PATENT OFFICE 2,649,871

SAW ATTACHMENT FOR DRILLS AND THE LIKE

Edward William Desbarat, Montreal, Quebec, Canada

Application October 30, 1950, Serial No. 192,839

2 Claims. (Cl. 144—35)

The invention relates to improvements in a saw attachment for drills and the like, as described in the present specification and illustrated in the accompanying drawings that form a part of the same.

The invention consists essentially of the novel features in construction as pointed out broadly and specifically in the claims for novelty following a description containing an explanation in detail of an acceptable form of the invention.

The objects of the invention are to devise a saw attachment consisting of a blade having individual sets of teeth movably mounted thereto around the edge of same and being engaged in turn by a shaft supported and driven sprocket, the shaft being connectable to a drill to be driven thereby; to make a saw attachment for particular use in connection with an electric hand drill consisting of continuous and unconnected sets of teeth movably mounted around the edge of a blade and driven therearound by a gear supported on a shaft which is connectable to a drill to be rotated thereby; to furnish a saw attachment for portable electric hand drills consisting of a blade supporting movable sets of saw teeth engageable with a shaft supported and driven gear, the shaft being connectable to the drill to be actuated thereby; to construct a saw attachment for drills and the like consisting of comparatively few and simple parts, easily and inexpensively manufactured; and generally to provide a saw attachment for drills and the like that is durable in construction, easily connected to a drill and that is efficient in its use.

In the drawings:

Figure 1 is a perspective view of the saw attachment as connected to a portable electric hand drill.

Figure 2 is a plan view of the attachment as detached from a drill.

Figure 3 is an enlarged sectional detail showing one of the teeth mountings as mounted to the blade on ball bearings, as taken on the line 3—3 in Figure 2.

Figure 4 is an enlarged sectional detail through the shaft support, as taken on the line 4—4 in Figure 2.

Figure 5 is an enlarged perspective view showing one of the teeth mountings with a pair of teeth secured therein.

Figure 6 is a perspective view showing a pair of teeth as removed from their mounting.

Like numerals of reference indicate corresponding parts in the various figures.

While the saw attachment as hereinafter described and illustrated is for use with a portable electric hand drill, it could be made of any desirable size for connection to any suitable power source.

Referring to the drawings, the saw attachment, as indicated by the numeral 10, consists of a flat plate 11 having continuous teeth, contained in holders movably mounted around its edge, the plate being fixedly mounted to a shaft support 12 in which a shaft is rotatably secured and having a sprocket 13, or gear, thereon which engages with the holders of the teeth, the shaft 15 being connectable to an electric hand drill 16, to be rotated thereby.

The plate 11 may be made in any required shape, but in this instance is somewhat egg-shaped. The plate has a circumferential lip 17 extending slightly outward and upward from the inside edge thereof, forming two raceways 18 and 19 respectively, extending completely around the periphery of the plate.

The shaft support 12 is an elongated and somewhat arcuate shaped member, made of metal or any other suitable and rigid material, fashioned with the bearings 20, 21 and 22 respectively forming a part thereof, the shaft 15 being rotatably mounted in the bearings and extending outwardly beyond the rear end of the support, the projecting end 15ª of the shaft being connectable to the drill.

The plate 11 is positioned flat against the inside face of the support 12, being parallel with the same and with the shaft, the plate extending forward of the front end of the shaft support. The plate is secured to the shaft support by means of a screw or bolt 23 located centrally of the plate and extending through the same and into the support, as shown in Figure 4. The plate is also fixed to the shaft support by means of the handle 24, which in this instance, is in the form of a straight piece of wood or metal projecting out from the outside face of the plate and being located towards the rear end of same. The handle extends through the plate, the inner end of the handle being threaded, 25, and engaging in a hole in the support.

The teeth or cutting edges 14, which extend completely around the periphery of the plate 11, are fashioned in sets or pairs, each pair 25 being formed from an individual single piece of material 26, the body portion of which is provided with a central aperture 26ª. The teeth are fashioned at a predetermined angle and of predetermined thickness or sharpness, depending on whether they are for the cutting of wood or metal, or other material. Each tooth unit, or pair of teeth, is fitted to an individual holder 28, to be removable therefrom. The holder is in the form of a metal section cut through the center from the bottom and terminating short of the top of the same, forming the sides 29 and 30 respectively. The top of the holder has a recessed portion into which the body of the unit 25 fits to be held therein by means of a rivet or bolt 31 extending through the holder into the aperture 26a in the unit, the unit forms a tight fit and together with the rivet, is immovably held to the holder. Each of the holders 28 is provided with a pair of recesses, 32 and 33 respectively, located adjacent the bottom edge of the inner side 29 thereof, the recesses being spaced apart and in line with one another, as shown in Figure 5.

A plurality of these holders 28 are fitted over the edge of the plate 11, being seated on the ball bearings 34 and 35 located in each of the raceways respectively around the preiphery of the plate, the upper inner corners of the holders 28 being fashioned to fit perfectly to the ball bearings, as shown in Figures 3 and 4.

A gear or sprocket 13 is fixedly mounted to the shaft 15, being located on the shaft in line with the rear of the plate 11, the teeth of the gear or sprocket engaging in the recesses 32 and 33 of the holder that is directly in front of the gear. Collars 37 and 38 around the shaft prevent it from being pulled out of the support 12.

The shaft support 12 has a cut-out section 39 towards its rear end and opposite the rear of the plate 11, and being of a depth approximately that of the thickness of the holders 28, permitting the holders to be engaged by the gear without coming in contact with the support.

In its use, the saw attachment is connected to the drill by having the projecting end 15a of the shaft fitted in the chuck 40 of the drill, the drill being turned on to thus rotate the shaft, the gear engaging in each of the holders 28 in turn, to thus cause the teeth to be moved around the plate, the person guiding the plate over the object being cut by means of the handle 24, the person holding the drill with his other hand.

It is of course understood that modifications and ramifications may be made without in any way departing from the spirit of the invention as hereinabove described and illustrated.

What I claim is:

1. A saw attachment for drills and the like consisting of a rigid plate suitably secured to a shaft connectable to a hand electric drill, said plate comprising a plurality of sets of teeth each set consisting of a pair of teeth demountably secured to the plate as an individual section, means adapted to permit said individual sections of teeth to move with respect to the said plate upon gear mechanism in engagement with each of the individual sections of teeth being actuated by the operation of the electric drill.

2. A saw attachment for drills and the like adapted to be detachably connected to an electric hand drill and comprising a plate, a plurality of sets of teeth detachably secured to said plate and being movable with respect to the same and forming the cutting edge of the saw attachment, said plate being a rigid and somewhat circular member consisting of a circumferential lip extending slightly outward and upward from the inside edge thereof forming two raceways extending around the periphery of the plate, each of said sets of teeth comprising a two teeth appropriately shaped and formed of a single piece of suitable material, a holder for each of said sets of teeth, each of said holders comprising a metal section having a cut out section in the top thereof, a set of said teeth being fitted into the cut out in the holder and suitably held therein to be removable therefrom, said holder having a cut out section through the center from the bottom up and terminating short of the top and forming sides to the holder, each of said holders having a recess located adjacent to the bottom of a certain one of its sides, said holders fitting to said plate over the upturned lip thereof and over the raceways formed thereby and being seated on ball bearings engaging in the raceways and with a portion of said holders, means of suitably securing said holders in position to the plate, and a gear suitably connected with respect to said plate and engaging in the recesses in the bottom of the side of the holders in turn to effect their movement around the periphery of said plate and thus operate the said sets of teeth.

EDWARD WILLIAM DESBARAT.

References Cited in the file of this patent

UNITED STATES PATENTS

| Number | Name | Date |
|---|---|---|
| 2,489,772 | Hall | Nov. 29, 1949 |
| 2,519,526 | Wilber | Aug. 22, 1950 |
| 2,544,461 | Leitzel | Mar. 6, 1951 |